(12) United States Patent
Haba et al.

(10) Patent No.: US 10,378,608 B2
(45) Date of Patent: Aug. 13, 2019

(54) ROTATION DAMPER WITH CONSTANT FRICTION COEFFICIENT

(71) Applicant: Lisa Draexlmaier GmbH, Vilsbiburg (DE)

(72) Inventors: Sever Alexandru Haba, Codlea (RO); Zoltan Bara, Ghimbav (RO)

(73) Assignee: Lisa Draexlmaier GmbH, Vilsbiburg (DE)

( * ) Notice: Subject to any disclaimer, the term of this patent is extended or adjusted under 35 U.S.C. 154(b) by 25 days.

(21) Appl. No.: 15/908,016

(22) Filed: Feb. 28, 2018

(65) Prior Publication Data

US 2018/0252289 A1 Sep. 6, 2018

(30) Foreign Application Priority Data

Mar. 1, 2017 (DE) .................. 10 2017 104 250

(51) Int. Cl.
*F16F 9/52* (2006.01)
*E05F 3/00* (2006.01)
(Continued)

(52) U.S. Cl.
CPC .............. *F16F 9/52* (2013.01); *E05F 3/00* (2013.01); *E05F 3/14* (2013.01); *E05F 5/00* (2013.01);
(Continued)

(58) Field of Classification Search
CPC .. F16F 9/52; F16F 9/06; F16F 2222/02; F16F 9/3242; F16F 5/00; F16F 9/36;
(Continued)

(56) References Cited

U.S. PATENT DOCUMENTS 2,873,963 A * 2/1959 Taylor ..................... B64C 25/60
188/269
2,882,042 A * 4/1959 Fleckenstein ............. F16F 9/52
267/34
(Continued)

FOREIGN PATENT DOCUMENTS

DE 610673 3/1935
DE 965892 6/1957
(Continued)

OTHER PUBLICATIONS

German Office Action for German Application No. 10 2017 104 250.4.
(Continued)

*Primary Examiner* — Robert A. Siconolfi
*Assistant Examiner* — Mahbubur Rashid
(74) *Attorney, Agent, or Firm* — Finnegan, Henderson, Farabow, Garrett & Dunner, LLP

(57) ABSTRACT

A temperature-independent rotation damper 100 is presented. A housing 108 and a piston 102, between which a viscous liquid is located in annular gaps 118, 120, rotate one around the other. When the temperature falls, the damping by the viscous liquid increases. This effect is countered by reducing the effective area which constitutes the braking action, or by enlarging the volume in the annular gaps 118, 120. As the drive, a material having a positive expansion coefficient is used, which material drives a piston 132. In this way, the damping of the rotation damper 100 is broadly practically independent of the temperature.

16 Claims, 3 Drawing Sheets

(51) Int. Cl.
  *E05F 3/14* (2006.01)
  *E05F 5/00* (2017.01)
  *F16F 9/14* (2006.01)
  *F16F 9/36* (2006.01)

(52) U.S. Cl.
  CPC ............... *F16F 9/14* (2013.01); *F16F 9/361* (2013.01); *F16F 9/365* (2013.01); *E05Y 2201/21* (2013.01); *E05Y 2201/266* (2013.01); *E05Y 2900/50* (2013.01); *F16F 2222/02* (2013.01); *F16F 2224/048* (2013.01); *F16F 2232/02* (2013.01)

(58) Field of Classification Search
  CPC .. F16F 9/362; F16F 9/18; F16F 9/3214; F16F 9/44; F16F 13/00; F16F 15/022; F16F 15/0235; F16F 2230/105; F16F 7/04; F16F 9/08; F16F 9/088; F16F 9/26; F16F 9/368; E05F 3/14; E05F 5/00
  See application file for complete search history.

(56) References Cited

U.S. PATENT DOCUMENTS

| | | | | |
|---|---|---|---|---|
| 2,944,639 A * | 7/1960 | Blake | ............. | F16F 9/003 188/269 |
| 3,375,001 A * | 3/1968 | Hennells | ............. | B21D 24/08 267/119 |
| 3,944,197 A * | 3/1976 | Dachicourt | ............. | F16F 9/088 267/64.23 |
| 4,054,277 A * | 10/1977 | Sirven | ............. | B60G 3/01 188/276 |
| 4,088,286 A * | 5/1978 | Masclet | ............. | B64C 25/60 244/102 SL |
| 4,513,953 A * | 4/1985 | Molders | ............. | F16F 9/0209 248/901 |
| 4,958,706 A * | 9/1990 | Richardson | ............. | F16F 9/096 188/277 |
| 5,004,215 A * | 4/1991 | Aubry | ............. | B64C 27/51 180/312 |
| 5,400,878 A | 3/1995 | D'Anna et al. | | |
| 5,404,972 A * | 4/1995 | Popjoy | ............. | F16F 9/02 188/277 |
| 5,727,440 A * | 3/1998 | Katz | ............. | F16F 9/02 91/4 R |
| 6,135,434 A * | 10/2000 | Marking | ............. | F16F 9/062 188/315 |
| 6,311,962 B1 * | 11/2001 | Marking | ............. | B60G 15/14 188/322.17 |
| 9,416,840 B2 * | 8/2016 | Vandine | ............. | F16F 9/0227 |
| 2004/0195062 A1 * | 10/2004 | Anderfaas | ............. | F16F 9/535 188/267.2 |
| 2015/0233441 A1 * | 8/2015 | Witwer | ............. | F16F 9/16 188/276 |

FOREIGN PATENT DOCUMENTS

| | | |
|---|---|---|
| DE | 601 10 284 T2 | 9/2005 |
| DE | 60110584 T2 | 1/2006 |
| EP | 1 289 729 B1 | 3/2003 |
| EP | 1 125 790 B1 | 4/2005 |
| GB | 1113312 | 5/1968 |
| JP | H08-93312 A | 4/1996 |
| JP | 2007-39999 A | 2/2007 |

OTHER PUBLICATIONS

Office Action in German Application No. DE 10 2017 104 250.4, dated Oct. 24, 2017.

Decision to Grant in German Application No. DE 10 2017 104 250.4, dated Feb. 19, 2018.

* cited by examiner

ROTATION DAMPER WITH CONSTANT FRICTION COEFFICIENT

CROSS REFERENCE TO RELATED APPLICATIONS

This application is based upon and claims the benefit of German Patent Application No. DE 10 2017 104 250.4, filed on Mar. 1, 2017, the entire contents of which is incorporated herein by reference.

TECHNICAL FIELD

The present disclosure relates to a rotation damper, which compensates a temperature-independent damping of the rotation, so that the damping remains the same, even with changing temperature.

BACKGROUND

Interiors of vehicles—in particular cars—are becoming increasingly comfortable. Some flaps and covers, as well as fold-down armrests, are equipped with rotation dampers in the respective hinges in order to guarantee a uniform movement of the flaps, covers or armrests. In particular in top-end vehicles, this uniform movement is expected to be maintained, even under extreme temperature fluctuations. Typically, however, present-day rotation dampers are temperature-dependent, i.e. the rotation damping increases when the temperature decreases. This negative aspect is manifested, inter alia, in vehicle tests in a climatic chamber. It can there be so cold that the damping of the rotation damper becomes so strong that a slow folding down—for example of a centre armrest—can no longer be ensured and the centre armrest accordingly remains in an oblique setting.

An object of the present disclosure is therefore to define a rotation damping—for instance for a bearing of a centre armrest, in which the rotation damping is temperature-independent.

SUMMARY

Exemplary embodiments of the present disclosure may address the above-stated object and others, for example. Additional objects and advantages of the disclosed embodiments will be set forth in part in the following description and the figures, and in part will be apparent from the description, or may be learned by practice of the embodiments. Objects and advantages of the disclosed embodiments may be realized and attained by the elements and combinations set forth in the claims. However, exemplary embodiments of the present disclosure are not necessarily required to achieve such exemplary objects and advantages, and some embodiments may not achieve any of the stated objects and advantages.

Embodiments of the present disclosure may provide a temperature-independent rotation damper for the compensation of temperature differences for rotation damping. The rotation damper may include a first piston. The first piston may be a rotationally fixed cylindrical hollow piston having an inner side and an outer side and having an extension which extends away from a head of the piston in the axial direction of the piston.

In some embodiments, a first housing having a cylindrical interior may surround a wall of the piston, so that a first annular gap is formed between a portion of a first inner side of the first housing and an outer side of the piston. Furthermore, a second annular gap may be formed between an inner side of the piston and a second inner side of the first housing. Within the first housing, between the first annular gap and the second annular gap, there may be a cavity providing an annular fluid connection between the first and the second annular gap.

An extension of the piston may project from an opening which lies opposite from a U-shaped opening of the first housing.

A first seal may be located between the inner side of the piston and the second inner side of the first housing, and a second seal may be located between the outer side of the piston and a first inner side of the first housing.

A viscous liquid may completely fill the first annular gap, the second annular gap and the cavity.

The extension may project into a second housing. The second housing may be a cylindrical housing that may have a fixed distance from the first housing. The extension may terminate at a second piston. The second piston may be a cylindrical piston. The second housing may include a first chamber and a second chamber. The first chamber, which may face away from the extension, may be completely filled with a material having a positive thermal expansion coefficient. In the second chamber, a spring may be located between the second piston and an inner wall of the second housing in the axial direction of the second piston. With decreasing temperature, the second piston may thereby be forced, together with the extension, into the second housing in an axial direction of the first housing. With increasing temperature, the second piston, with the extension, may be pushed in the direction of the first housing.

In addition, the rotation damper may have within the first housing a closed reservoir. The reservoir may be filled partially with the viscous liquid and partially with a gas. The viscous liquid and the gas may be separated from each other by a diaphragm. Moreover, the viscous liquid in the reservoir may be in fluid connection with the viscous liquid in the cavity through a channel which is completely filled with the viscous liquid.

BRIEF DESCRIPTION OF THE DRAWINGS

The above and other aspects of the present disclosure will become more apparent by describing exemplary embodiments in detail below with reference to the accompanying drawings, in which.

DETAILED DESCRIPTION

Figure 1:
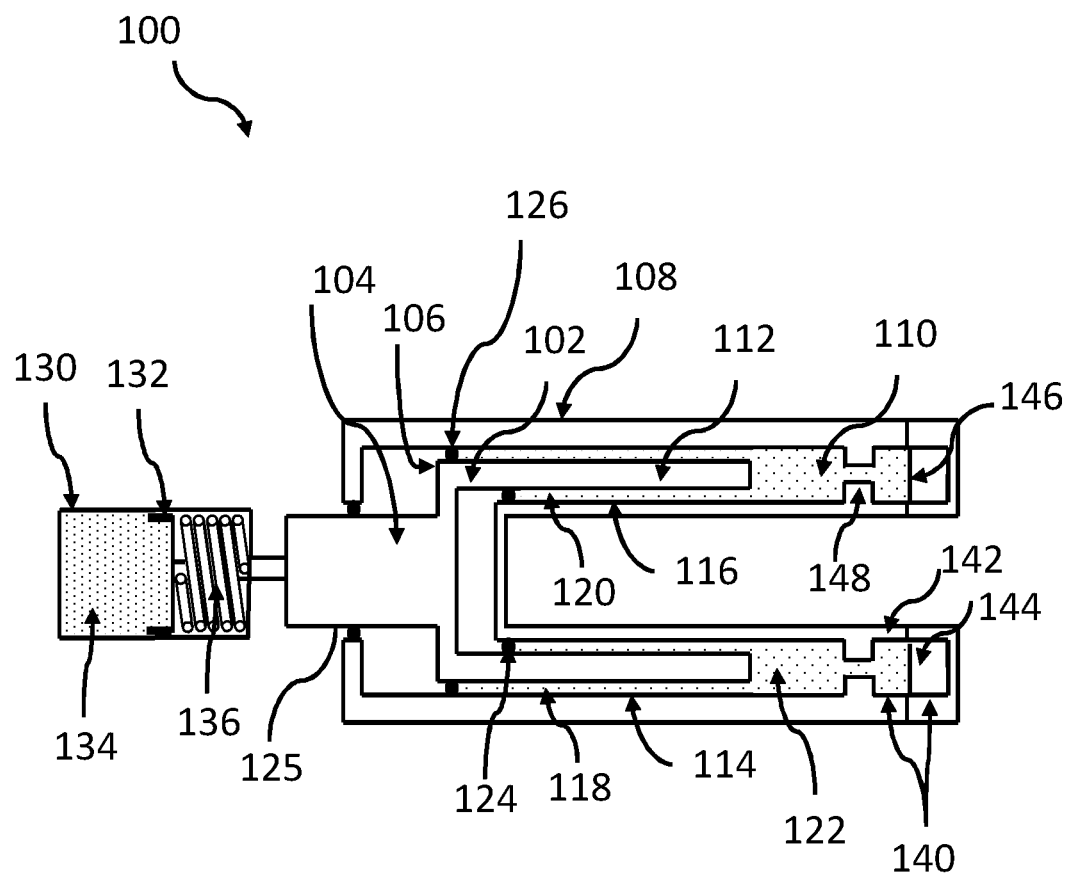
FIG. 1 shows a cross section through a rotation damper consistent with embodiments of the present disclosure.

The following terms and expressions are used in this document:

The term "rotation damper" describes an apparatus which opposes a rotary movement at a shaft having a constant torque. This involves a constant braking action, so that arms which have a shaft at one end do not simply drop down as a result of gravity, but slide down gently.

The term "extension" here may refer to an elongation of a head of a piston in a direction away from the piston. The extension can taper and lead to a further head of a further piston.

The term "material with positive thermal expansion coefficient" describes a material whose volume expands with increasing temperature. The force which is generated herein can be used to compel a translational movement.

The here-presented concept of the temperature-independent rotation damper may have a number of advantages. For example, the rotation damper can keep its damping characteristic practically constant over a wide range of temperature. The interlocking elements of the first housing and of the first piston can compensate for the variable viscosity of the viscous liquid via a translational movement of the first piston further into the first housing, or somewhat out of the first housing, by alteration of the counter-rotating areas. Therefore, if the viscosity of the viscous liquid in the rotation damper falls with decreasing temperature, the usable volume of the viscous liquid, where volume constitutes the actual damping, is increased, whereby the relative damping falls. In this way, the negative effect of the falling viscosity can be compensated for. A material having a positive temperature-related expansion coefficient forms, together with a spring, the necessary translational drive of the first piston in the rotation damper.

Electronic components for monitoring purposes, as well as hydraulic pumps, can be completely dispensed with. The rotation damper can thereby become low-maintenance. Moreover, its compact design enables it to be integrated in existing hinges—such as, for instance, flaps or covers in the interior of a vehicle, in particular including in center armrests. In addition, it is able to be produced in a simple and cost-effective manner.

Further advantageous embodiments are described in connection with the figures.

It should be noted that embodiments of the present disclosure may be expressed with reference to different subjects of invention. In particular, some embodiments of the present disclosure can correspond to apparatus claims, and other embodiments of the present disclosure can correspond to method claims. To the person skilled in the art, it will immediately become clear when reading the present disclosure that, unless expressly otherwise stated, in addition to a combination of features which belong to one category of a subject of invention, any chosen combination of features belonging to different categories of subjects of invention is possible.

Further advantages and features of the present disclosure may emerge from the following exemplary description of currently preferred embodiments. The individual figures of the drawings of the present disclosure should be regarded merely as schematic, exemplary and as not necessarily true to scale.

It should be noted that features or components of different embodiments which are the same or at least functionally the same, with the corresponding features or components according to the embodiment, are provided with the same reference symbols or with another reference symbol which differs merely in its first digit from the reference symbol of a (functionally) corresponding feature or of a (functionally) corresponding component. In order to avoid unnecessary repetitions, features or components already explained with reference to a previously described embodiment are not further explained in detail at a later point.

It should also be noted that the hereinafter described embodiments represent merely a limited selection of possible design variants of the aspects of the present disclosure. In particular, it is possible to combine the features of individual embodiments in suitable manner one with another, so that, for the person skilled in the art, with the here expressly represented design variants a variety of different embodiments can be deemed to have been obviously disclosed.

FIG. 1 shows a cross section through a temperature-independent rotation damper 100 according to an embodiment of the present disclosure. The rotation damper 100 may be configured to compensate temperature differences in the course of rotation damping. The rotation damper 100 includes a rotationally fixed cylindrical hollow first piston 102 having an inner side and an outer side, and having an extension 104 which extends away from a head 106 of the first piston 102 in the axial direction of the first piston 102.

A first housing 108 having a cylindrical interior 110 surrounds a wall 112 of the first piston 102, so that between a portion of a first inner side 114 of the first housing 108 and the outer side of the first piston 102 a first annular gap 118 is formed, and so that between the inner side of the first piston 102 and a second inner side 116 of the first housing 108 a second annular gap 120 is formed.

Within the first housing 108, between the first annular gap 118 and the second annular gap 120, there is a cavity 122 of the cylindrical interior 110 providing an annular fluid connection 122 between the first annular gap 118 and the second annular gap 120.

The extension 104 of the first piston 102 projects from an opening 125 which lies opposite from a U-shaped opening (e.g., an internal cavity formed by an open-ended hollow cylindrical structure) of the first housing 108.

A first seal 124—for instance in the form of an O-ring—between the inner side of the first piston 102 and the second inner side 116 of the first housing 108 prevents a viscous liquid 142 from being able to escape from the second annular gap 120.

A second seal 126 between the outer side of the first piston 102 and the first inner side 114 of the first housing 108 prevents the viscous liquid 142 from being able to escape from the first annular gap 118. In addition, a third seal—in turn designed as an O-ring—can be positioned between the extension 104 and a region of the opening 125. It should be noted that the mutually sealed-off elements can rotate counter to each other. In this respect, the seals in question are rotation-suitable seals. Thus, the seals may be configured to allow rotation and translation of the respective sealed-off elements.

The viscous liquid 142 completely fills the first annular gap 118, the second annular gap 120 and the cavity 122.

A second housing 130 has a fixed, predefined distance from the first housing 108. The fixed distance may be in the axial direction of the first piston 102. Thus, the first housing 108 and the second housing 130 may be fixedly connected to each other. This can be realized, for instance, by the mounting of the first housing 108 and the second housing 130 on a common base, or by the existence of a rigid connection of a different type between the first housing 108 and the second housing 130. This can be achieved, for instance, by a common rigid enclosure. The second housing 130 may be a cylindrical housing.

The extension 104 reaches into the second housing 130. The extension 104 may include a reduced diameter portion. The extension 104 projects into the second housing 130 and ends at a second piston 132, which is movable within the second housing 130 along an imaginary center axis. The extension 104 may be fixed to the second piston 132. The second piston 132 may be a cylindrical piston. There may be a first side on one side of the second piston 132, which faces away from the extension 104, and a second side on an opposite side thereof. There may be provided a material configured to expand or contract with increasing temperature, which may be provided at the first side, at the second side, or both.

For example, in FIG. 1, the second housing 130 includes a first chamber 134, which faces away from the extension 104 in reference to the piston 132, and which is completely filled with a material having a positive thermal expansion coefficient. The material having a positive thermal expansion coefficient may be a liquid.

In a second chamber of the second housing 130, a spring 136 is located between the second piston 132 and an inner wall or the base of the second housing 130 in the axial direction of the second piston 132. The spring 136 may be configured to urge the second piston 132 away from the first housing 108 in the axial direction of the second piston 132.

The rotation damper 100 may be configured to compensate for temperature variations in rotational damping. For example, the rotation damper 100 may be configured so that, with decreasing temperature, the second piston 132 pulls the extension 104—and thus the first piston 102—out of the first housing 108. Furthermore, with increasing temperature, the piston 132, by means of the extension 104, pushes the first piston 102 further into the first housing 108. In this way, the effective damping volume of the rotation damper 100 for the viscous liquid is enlarged, so that the damping effect which exists as a result of a temperature-related lower viscosity is compensated for at higher temperatures.

In addition, the rotation damper 100 has within the first housing 108 a closed reservoir 140, which is filled partially with the viscous liquid 142 and partially with a gas 144. The viscous liquid 142 and the gas 144 are separated from each other by a diaphragm 146. Moreover, the viscous liquid 142 is in fluid connection with the cavity 122 through a channel 148 completely filled with the viscous liquid 142. In some embodiments, the channel 148 can be omitted and the reservoir 140 is directly integrated with the cavity 122 and the diaphragm 146.

According to one illustrative embodiment, the viscous liquid can be constituted by silicone oil, whilst the material having a positive thermal expansion coefficient in the first chamber 134 can be constituted by polypropylene (PP) having a linear expansion coefficient of, for example, 100 to $200 \times 10^{-6}$ m/(mK). In some embodiments, the material in the first chamber 134 may have a linear thermal expansion coefficient of greater than or equal to $100 \times 10^{-6}$ m/(mK).

As alternative materials that can be provided in the first chamber 134, the following organic compounds may be considered: polyethylene (PE), polyethylene-terephthalate (PET), glass-fiber reinforced polypropylene, polystyrene (PS), polysulphone (PSO) and rigid polyurethane (PU/PUR). It should be noted that these alternative materials—apart from polyurethane (PU/PUR), which has a high molecular weight—may have significantly lower thermal expansion coefficients. In some embodiments, the material 134 can be dispensed with. The functions can be taken over by a bimetal spring which expands or contracts in accordance with the prevailing temperature. For example, the spring 136 may be provided in the second housing 130. In some embodiments, spring 136 may be omitted.

Figure 2:
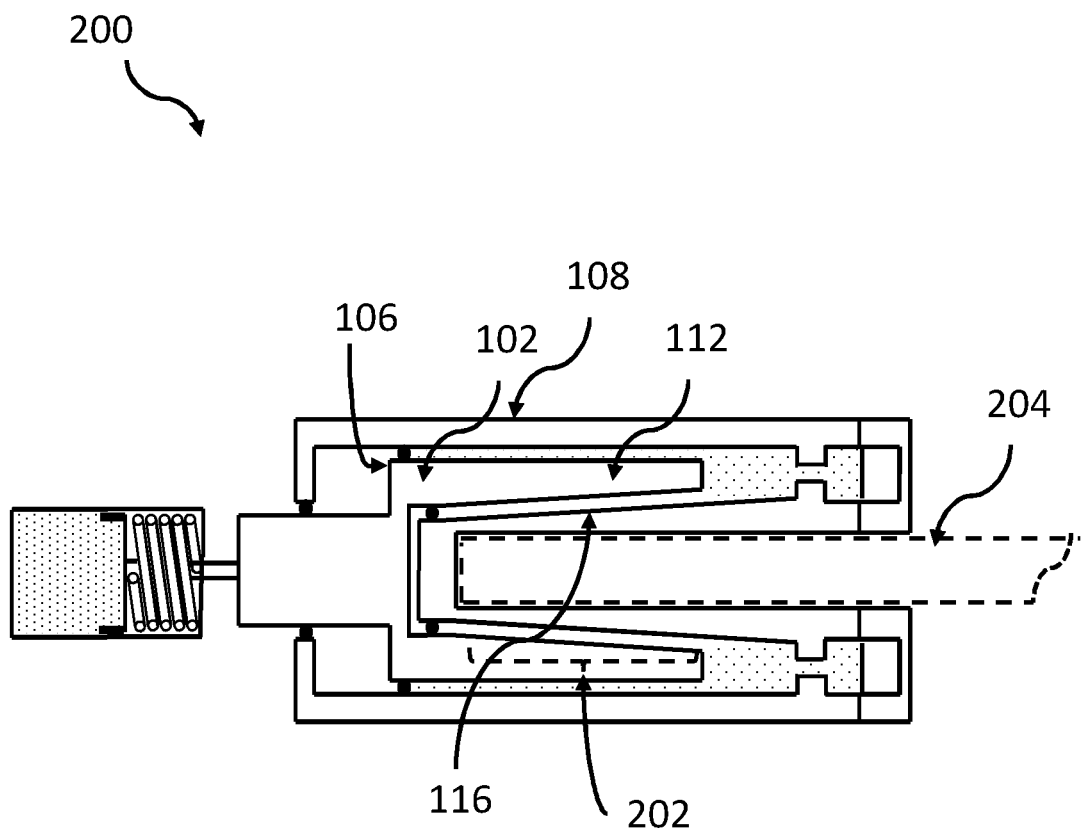
FIG. 2 represents a cross section through a modified rotation damper consistent with embodiments of the present disclosure.

FIG. 2 represents a cross section through a modified rotation damper 200 according to an embodiment of the present disclosure. In the rotation damper 200, the wall 112 of the first piston 102 thickens conically in a direction toward the head 106 of the first piston 102. In accordance with the cone angle of the piston wall, the second inner side 116 of the first housing 108, along a portion 202 corresponding to the internally conically tapered first piston 102, is also conical in shape. In this way, the volume of the second annular gap 120 lying between the conical portions enlarges faster if the extension 104—and thus the first piston 102—is drawn in the direction of the second housing 130. In this way, a lower temperature sensitivity of the rotation damper 200 can be achieved. A larger volume of the viscous liquid 142 between the counter-rotating parts—thus in the annular gaps 118, 120—signifies a lower damping value (at same temperature).

Figure 3:
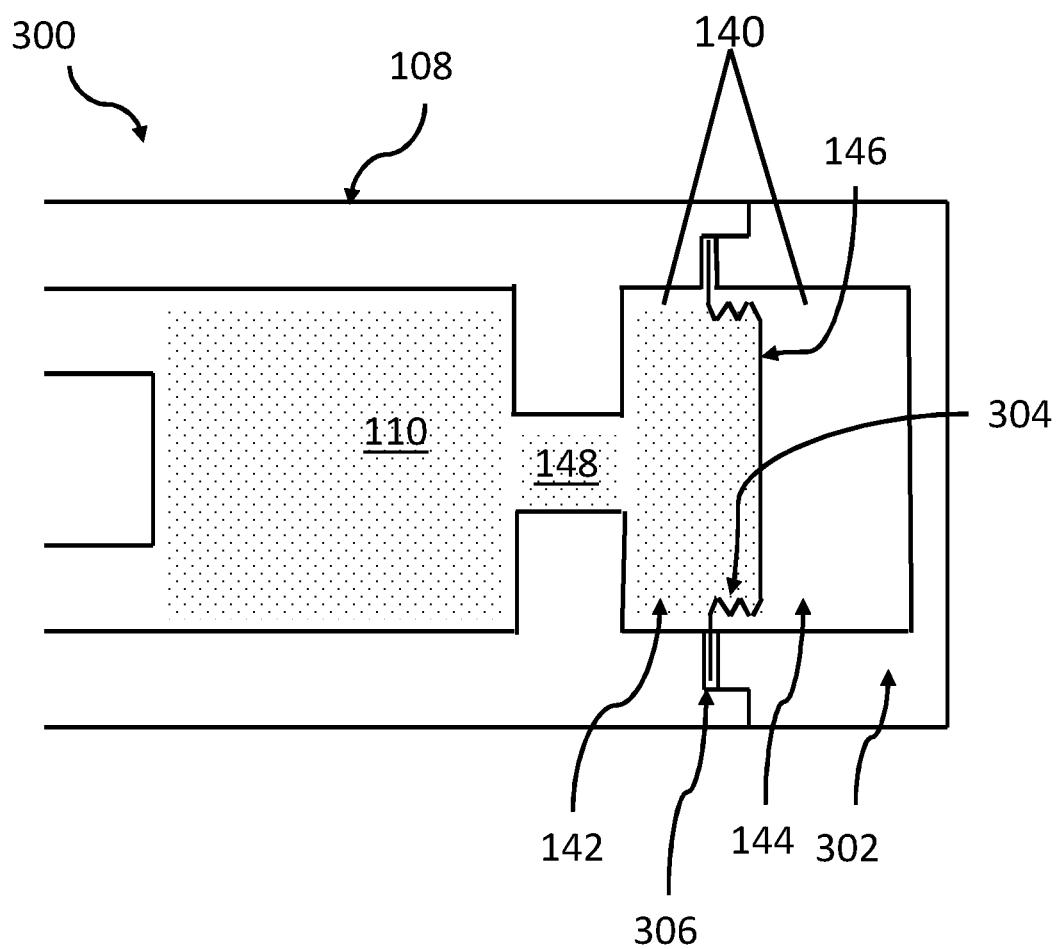
FIG. 3 represents a cross section through a detailed view of the reservoir.

FIG. 3 represents a cross section through a detailed view 300 of the reservoir 140. A base 302 of the reservoir 140 can be connected to the rest of the first housing 108—for instance by a screw connection, bonding, or the like. The reservoir 140 may be formed of two annular half-shells, of which, a first half-shell may be constituted by one end of the first housing 108 and a second half-shell may be constituted by the base 302, which may be a U-shaped ring (e.g., a ring with a cylindrical part having a U-shaped cross section). At a joint 306, the diaphragm 146 can be clamped in place. The diaphragm 146 can additionally have a bellows-like structure so that the viscous liquid 142 can make its way out of the reservoir 140 more easily through the channel 148 into the cavity 110. For example, the diaphragm may include bellows 304. In addition, there may be an opening (not shown) in the base 302, through which atmospheric air can after-flow into the reservoir 140, or flow out of the same, when the diaphragm 146 moves.

In both FIG. 1 and in FIG. 2, it can be seen that, according to one advantageous embodiment, the first piston 102, the extension 104, the first housing 108, and the base 302 have a common theoretical center axis. For example, the first piston 102, the extension 104, the first housing 108, and the base 302 may lie on a longitudinal axis about which the foregoing components are rotationally symmetric. Furthermore, the second housing 130 and the second piston 132 may also be aligned with the longitudinal axis.

With reference to FIG. 2, it can further be seen that the rotation damper 100, according to an advantageous illustrative embodiment, is configured to receive, at the first housing 108, a shaft 204 in the axial direction of the first housing 108, so that the shaft, together with the first housing 108, is rotatable about the first piston 102, or rotatable in the first piston 102. The shaft 204, which is fixedly connected to the housing 108, can be fastened to, for instance, a centre armrest of a vehicle.

Having described aspects of the present disclosure in detail, it will be apparent that further modifications and variations are possible without departing from the scope of aspects of the present disclosure as defined in the appended claims. As various changes could be made in the above constructions without departing from the scope of aspects of the present disclosure, it is intended that all matter contained in the above description and shown in the accompanying drawings shall be interpreted as illustrative and not in a limiting sense.

REFERENCE SYMBOL LIST 100 rotation damper
102 first piston
104 extension
106 head of the first piston
108 first housing
110 cylindrical interior of the first housing
112 walls of the piston
114 first inner side of the first housing
116 second inner side of the first housing 118 first annular gap
120 second annular gap
122 cavity
124 first seal
125 opening of the first housing
126 second seal
130 second housing
132 second piston
134 first chamber
136 spring
140 reservoir
142 viscous liquid
144 gas
146 diaphragm
148 channel
202 portion
204 shaft
300 detailed view
302 base
304 bellows
306 joint

What is claimed is:

1. A rotation damper comprising:
   a cylindrical hollow first piston having an inner side, an outer side, and an extension which extends away from a head of the first piston in an axial direction of the first piston;
   a first housing having a cylindrical interior which surrounds a wall of the first piston, so that a first annular gap is formed between a portion of a first inner side of the first housing and the outer side of the first piston, and a second annular gap is formed between the inner side of the first piston and a second inner side of the first housing,
      wherein the extension of the first piston projects from a first opening which lies opposite a second opening of the first housing;
   a first seal between the inner side of the first piston and the second inner side of the first housing;
   a second seal between the outer side of the first piston and the first inner side of the first housing,
      wherein the first annular gap, the second annular gap, and a cavity between the first and the second annular gap are configured to be filled with a viscous liquid; and
   a cylindrical second housing, which has a fixed distance from the first housing, wherein the extension projects into the second housing and ends at a cylindrical second piston,
      wherein a first chamber, which faces away from the extension, is configured to be filled with a material having a volume that expands with increasing temperature,
      wherein, in a second chamber of the second housing, a spring is located between the second piston and an inner wall of the second housing in an axial direction of the second piston, and
      wherein the rotation damper is configured so that the second piston, with decreasing temperature, pulls the extension out of the first housing, and with increasing temperature, pushes the extension into the first housing.

2. The rotation damper according to claim 1, further comprising:
   a closed reservoir within the first housing, wherein the reservoir is configured to be at least partially filled with the viscous liquid and at least partially filled with a gas;
   a diaphragm configured to separate the viscous liquid from the gas; and
   a channel configured to be filled with the viscous liquid, such that the viscous fluid in the channel is in fluid connection with the cavity.

3. The rotation damper according to claim 2, wherein the reservoir is formed of two annular half-shells, of which a first half-shell is formed by one end of the first housing and a second half-shell is formed by a U-shaped ring, wherein the diaphragm is fixed at a joint between the first housing and the U-shaped ring.

4. The rotation damper according to claim 3, wherein the first piston, the extension, the first housing and the U-shaped ring have a common center axis.

5. The rotation damper according to claim 1, wherein the viscous liquid is silicone oil.

6. The rotation damper according to claim 1, further comprising:
   a third seal between the extension and the first opening of the first housing.

7. The rotation damper according to claim 1, wherein the outer sides of the first housing and the second housing are connected to each other.

8. The rotation damper according to claim 1, wherein the first housing is configured to receive a shaft in an axial direction of the first housing, such that the shaft and the first housing are rotatable together about the first piston or rotatable in the first piston.

9. The rotation damper according to claim 1, wherein the material with volume that expands with increasing temperature is selected from the group consisting of polyethylene (PE), polyethylene-terephthalate (PET), glass-fiber reinforced polypropylene, polystyrene (PS), polysulphone (PSO) and rigid polyurethane.

10. The rotation damper according to claim 1, wherein the first piston is rotationally fixed relative to the first housing.

11. The rotation damper according to claim 1, further comprising:
    a reservoir within the first housing,
       wherein the reservoir is filled partially with the viscous liquid and partially with a gas,
       wherein the viscous liquid and the gas are separated from each other by a diaphragm, and
       wherein the viscous liquid is in fluid connection with the cavity.

12. The rotation damper according to claim 11, wherein the diaphragm includes a bellows.

13. The rotation damper according to claim 11, wherein the reservoir comprises an opening configured to allow atmospheric air to flow into the reservoir.

14. The rotation damper according to claim 1, wherein the wall of the first piston is conically tapered toward the head of the first piston.

15. The rotation damper according to claim 14, wherein the second inner side of the first housing is conically tapered in accordance with a cone angle of the wall of the first piston.

16. The rotation damper according to claim 1, wherein the second inner side of the first housing is conically tapered.

* * * * *